US012562882B2

(12) United States Patent
He et al.

(10) Patent No.: US 12,562,882 B2
(45) Date of Patent: Feb. 24, 2026

(54) METHOD AND APPARATUS FOR SENSING AND COMMUNICATION

(71) Applicant: HUAWEI TECHNOLOGIES CO., LTD., Shenzhen (CN)

(72) Inventors: Jia He, Chengdu (CN); Xianfeng Du, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 375 days.

(21) Appl. No.: 18/324,795

(22) Filed: May 26, 2023

(65) Prior Publication Data

US 2023/0299934 A1 Sep. 21, 2023

Related U.S. Application Data

(63) Continuation of application No. PCT/CN2021/113524, filed on Aug. 19, 2021.

(30) Foreign Application Priority Data

Nov. 28, 2020 (CN) .......................... 202011363708.5

(51) Int. Cl.
 *H04L 5/14* (2006.01)
(52) U.S. Cl.
 CPC ...................................... *H04L 5/14* (2013.01)
(58) Field of Classification Search
 None
 See application file for complete search history.

(56) References Cited

U.S. PATENT DOCUMENTS

| | | | |
|---|---|---|---|
| 2008/0165048 A1* | 7/2008 | Shklarsky | G01S 13/003 |
| | | | 342/59 |
| 2009/0079620 A1* | 3/2009 | Van Caekenberghe | |
| | | | G01S 13/536 |
| | | | 342/200 |
| 2016/0018511 A1* | 1/2016 | Nayyar | G01S 7/03 |
| | | | 342/27 |

(Continued)

OTHER PUBLICATIONS

3GPP TSG RAN WG1 #102e, R1-2005839, E-meeting, Aug. 17-Aug. 28, 2020, Agenda Item: 8.11.2.1 (Year: 2020).*

*Primary Examiner* — Hassan A Phillips
*Assistant Examiner* — Gautam Sharma
(74) *Attorney, Agent, or Firm* — Leydig, Voit & Mayer, Ltd.

(57) ABSTRACT

A method and an apparatus for sensing and communication is provided. The method includes: a first device obtains a sensing parameter including a physical feature of a sensing target; configures a first frame based on the sensing parameter, and performs sensing on the first frame. The first frame includes M first time periods and N second time periods, both M and N are integers greater than or equal to 0, without being equal to 0 at the same time. The first device sends or receives a waveform of a communication signal during the first time period, and sends or receives a waveform of a sensing signal during the second time period. According to this application, spectral efficiency can be improved as sensing is performed without affecting communication thereby minimizing communication overheads, and sensing and communication occupy a same spectrum resource thereby meeting the requirements of sensing and communication.

20 Claims, 7 Drawing Sheets

(56) References Cited

U.S. PATENT DOCUMENTS

| 2016/0191232 | A1* | 6/2016 | Subburaj | G01S 7/4017 |
| | | | | 342/195 |
| 2019/0059071 | A1* | 2/2019 | Khoryaev | H04W 4/021 |
| 2020/0057136 | A1* | 2/2020 | Doescher | G01S 13/584 |
| 2020/0128483 | A1* | 4/2020 | Dong | H04W 74/0808 |
| 2020/0142406 | A1* | 5/2020 | Srini | G01S 17/931 |
| 2020/0319327 | A1 | 10/2020 | Tsvelykh et al. | |
| 2021/0333386 | A1* | 10/2021 | Park | G01S 7/356 |
| 2023/0275813 | A1* | 8/2023 | Feng | H04B 17/345 |
| | | | | 718/102 |
| 2023/0309144 | A1* | 9/2023 | Zhu | H04W 56/0015 |

* cited by examiner

A first device obtains a sensing parameter, where the sensing parameter includes a physical feature of a sensing target  ⌐ 301

The first device configures a first frame based on the sensing parameter, where the first frame includes M first time periods and N second time periods, the first time period is a time period in which the first device sends or receives a waveform of a communication signal, the second time period is a time period in which the first device sends or receives a waveform of a sensing signal, both M and N are integers greater than or equal to 0, and M and N are not 0 at the same time  ⌐ 302

The first device performs sensing on the first frame  ⌐ 303

FIG. 3

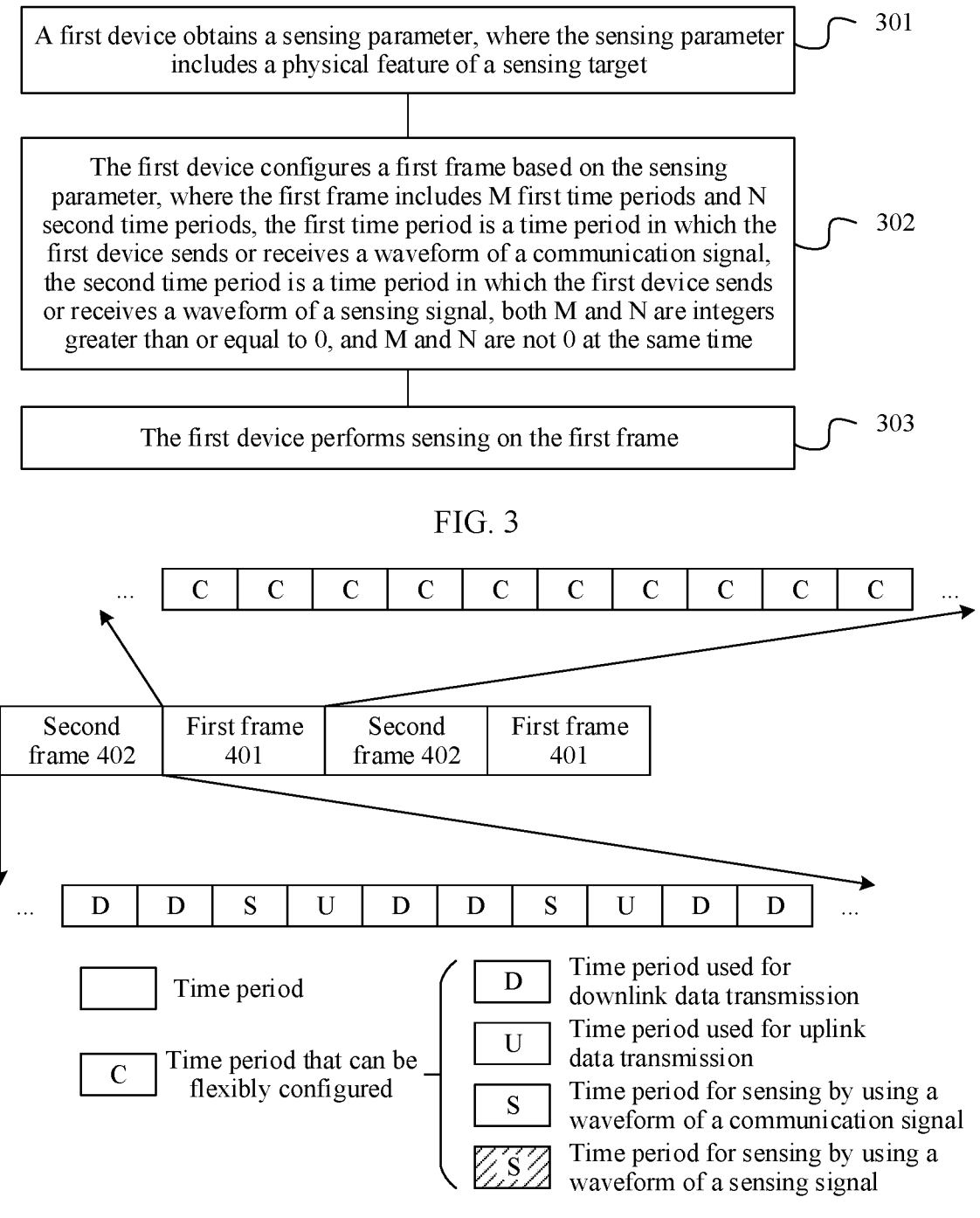

FIG. 4

| Case 801 | D | D | S | U | D | D | S | U | D | D |
|---|---|---|---|---|---|---|---|---|---|---|

| Case 802 | D | D | D | D | D | D | D | D | S | U |
|---|---|---|---|---|---|---|---|---|---|---|

| Case 803 | D | D | S | U | D | D | S | U | D | D |
|---|---|---|---|---|---|---|---|---|---|---|

| Case 804 | S | S | S | S | S | S | D | S | U | U |
|---|---|---|---|---|---|---|---|---|---|---|

| Case 805 | D | D | D | D | D | D | D | S | U | U |
|---|---|---|---|---|---|---|---|---|---|---|

| D | Time period used for downlink data transmission | | S | Time period for sensing by using a communication waveform |
|---|---|---|---|---|
| U | Time period used for uplink data transmission | | S | Time period for sensing by using a sensing waveform |

METHOD AND APPARATUS FOR SENSING AND COMMUNICATION

CROSS-REFERENCE TO RELATED APPLICATIONS

This application is a continuation of International Application No. PCT/CN2021/113524, filed on Aug. 19, 2021, which claims priority to Chinese Patent Application No. 202011363708.5, filed on Nov. 28, 2020. The disclosures of the aforementioned applications are hereby incorporated by reference in their entireties.

TECHNICAL FIELD

Embodiments of this application relate to the communication field, and more specifically, to a method and an apparatus for sensing and communication.

BACKGROUND

With development of communication services, demands for a communication rate are increasingly high, resulting in a shortage of frequency resources. In a future communication technology, obtaining sensing information from an environment becomes a necessary means. For example, in an automatic driving scenario, a vehicle needs to sense whether there is an obstacle in front of the vehicle and a situation of the obstacle; and in a process of mobile phone map navigation, it is also necessary to sense whether there is an obstacle on a navigation route during data transmission. In addition, because sensing and imaging require a large quantity of resources, communication overheads are high, and a communication capacity is impacted. In particular, imaging with a high requirement causes higher overheads. Therefore, to reduce spectrum resources, hardware resources, and the like, integrated sensing and communication has become a trend.

In the conventional technology, a time-division duplexing (TDD) mode is used for communication and sensing functions, a communication system and a sensing system occupy different time, a frame moment used for communication provides a communication service, a frame moment used for sensing provides a sensing service, and the two frame moments do not affect each other. Alternatively, a same system is used for communication and sensing functions, and a same waveform is used. To be specific, a communication-oriented waveform may be used to perform communication and sensing at the same time, or a sensing-oriented waveform may be used to perform communication and sensing at the same time. When the communication-oriented waveform is used to perform communication and sensing at the same time, a communication capability is strong, and a sensing capability is poor. When the sensing-oriented waveform is used to perform communication and sensing at the same time, a sensing capability is good, and a communication capability is poor.

It can be learned that a current solution for integrated sensing and communication easily causes resource waste, and cannot ensure performance of sensing and communication at the same time. Therefore, how to meet requirements of sensing and communication while reducing overheads is still a problem that needs to be resolved.

SUMMARY

Embodiments of this application provide a method and an apparatus for sensing and communication, so that communication and sensing requirements can be met while reducing overheads.

According to a first aspect, a frame configuration method for sensing is provided. The method includes: A first device obtains a sensing parameter, where the sensing parameter includes a physical feature of a sensing target. The first device configures a first frame based on the sensing parameter, where the first frame includes M first time periods and N second time periods, the first time period is a time period in which the first device sends or receives a waveform of a communication signal, the second time period is a time period in which the first device sends or receives a waveform of a sensing signal, both M and N are integers greater than or equal to 0, and M and N are not 0 at the same time. The first device performs sensing on the first frame.

This application is used for an integrated sensing and communication system. The first device performs sensing on the first frame configured based on the sensing parameter. This ensures that communication is not affected when sensing is performed, and minimizes communication overheads. In addition, sensing and/or communication are/is performed on the flexibly configured first frame, and sensing and communication occupy a same spectrum resource, so that requirements of sensing and communication can be met. Therefore, spectral efficiency is further improved.

With reference to the first aspect, in some implementations of the first aspect, that a first device obtains a sensing parameter includes: The first device obtains the sensing parameter by using a second frame, where the second frame is a frame in which the first device sends or receives the waveform of the communication signal.

With reference to the first aspect, in some implementations of the first aspect, that a first device obtains a sensing parameter includes: The first device obtains the sensing parameter by using a second frame, where the second frame is a frame in which the first device sends or receives the waveform of the sensing signal.

With reference to the first aspect, in some implementations of the first aspect, that a first device obtains a sensing parameter includes: The first device receives indication information from a second device, where the indication information includes the sensing parameter.

With reference to the first aspect, in some implementations of the first aspect, that the first device performs sensing on the first frame includes: The first device performs communication and/or sensing in the M first time periods, and performs sensing in the N second time periods.

With reference to the first aspect, in some implementations of the first aspect, that the first device configures a first frame based on the sensing parameter includes: The first device determines an imaging requirement based on the sensing parameter, where the imaging requirement includes a configuration parameter for performing sensing by the first device; and the first device configures the first frame based on the imaging requirement.

With reference to the first aspect, in some implementations of the first aspect, the method further includes: The first device receives request information, where the request information is used to request the first device to obtain the sensing parameter.

With reference to the first aspect, in some implementations of the first aspect, that the first device configures a first frame based on the sensing parameter includes: When the first device determines, based on the sensing parameter, to perform sensing by using the first time period, the first device configures the first frame as a frame including at least the M first time periods.

With reference to the first aspect, in some implementations of the first aspect, that the first device configures a first frame based on the sensing parameter includes: When the first device determines, based on the sensing parameter, to perform sensing by using the second time period, the first device configures the first frame as a frame including at least the N second time periods.

The first device determines, by obtaining the sensing parameter of the sensing target and/or the imaging requirement of the first device, whether the first device performs sensing by using the first time period or the second time period, and then performs sensing on the flexibly configured first frame based on different determining results. This ensures that communication is not affected when sensing is performed, and minimizes communication overheads. In addition, sensing and/or communication are/is performed on the flexibly configured first frame, and sensing and communication occupy a same spectrum resource, so that requirements of sensing and communication can be met. Therefore, spectral efficiency is further improved.

According to a second aspect, an apparatus for sensing and communication is provided. The apparatus includes: a transceiver unit, where the transceiver unit is configured to obtain a sensing parameter, and the sensing parameter includes a physical feature of a sensing target; and a processing unit, where the processing unit is configured to configure a first frame based on the sensing parameter, where the first frame includes M first time periods and N second time periods, the first time period is a time period in which the first device sends or receives a waveform of a communication signal, the second time period is a time period in which the first device sends or receives a waveform of a sensing signal, both M and N are integers greater than or equal to 0, M and N are not 0 at the same time, and the transceiver unit is further configured to perform sensing on the first frame.

With reference to the second aspect, in some implementations of the second aspect, that the transceiver unit is configured to obtain a sensing parameter includes: The transceiver unit is configured to obtain the sensing parameter by using a second frame, where the second frame is a frame for sending or receiving the waveform of the communication signal.

With reference to the second aspect, in some implementations of the second aspect, that the transceiver unit is configured to obtain a sensing parameter includes: The transceiver unit is configured to obtain the sensing parameter by using a second frame, where the second frame is a frame for sending or receiving the waveform of the sensing signal.

With reference to the second aspect, in some implementations of the second aspect, that the transceiver unit is configured to obtain a sensing parameter includes: The transceiver unit is configured to receive indication information from a second device, where the indication information includes the sensing parameter.

With reference to the second aspect, in some implementations of the second aspect, that the transceiver unit is further configured to perform sensing on the first frame includes: The transceiver unit is further configured to: perform communication and/or sensing in the M first time periods, and perform sensing in the N second time periods.

With reference to the second aspect, in some implementations of the second aspect, that the processing unit is configured to configure a first frame based on the sensing parameter includes: The processing unit is configured to determine an imaging requirement based on the sensing parameter, where the imaging requirement includes a configuration parameter for performing sensing by the transceiver unit; and the processing unit is further configured to configure the first frame based on the imaging requirement.

With reference to the second aspect, in some implementations of the second aspect, the transceiver unit is further configured to receive request information, where the request information is used to request to obtain the sensing parameter.

With reference to the second aspect, in some implementations of the second aspect, that the processing unit is configured to configure a first frame based on the sensing parameter includes: When the processing unit is configured to determine, based on the sensing parameter, to perform sensing by using the first time period, the processing unit is further configured to configure the first frame as a frame including at least the M first time periods.

With reference to the second aspect, in some implementations of the second aspect, that the processing unit is configured to configure a first frame based on the sensing parameter includes: When the processing unit is configured to determine, based on the sensing parameter, to perform sensing by using the second time period, the processing unit is further configured to configure the first frame as a frame including at least the N second time periods.

In this application, the sensing parameter of the sensing target and/or the imaging requirement of the first device are/is obtained to determine whether the first device performs sensing by using the first time period or the second time period, and then sensing is performed on the flexibly configured first frame based on different determining results. This ensures that communication is not affected when sensing is performed, and minimizes communication overheads. In addition, sensing and/or communication are/is performed on the flexibly configured first frame, and sensing and communication occupy a same spectrum resource, so that requirements of sensing and communication can be met. Therefore, spectral efficiency is further improved.

According to a third aspect, a communication apparatus is provided. The communication apparatus includes: a memory, where the memory is configured to store a computer program; and a processor, where the processor is configured to execute some or all of computer programs stored in the memory, so that the device performs the method according to any one of implementations of the first aspect.

According to a fourth aspect, a computer storage medium is provided, including a computer program. When some or all of computer programs are run on a computer, the computer is enabled to perform the method according to any one of implementations of the first aspect.

BRIEF DESCRIPTION OF DRAWINGS

FIG. 3 is a schematic flowchart of a method for sensing and communication according to an embodiment of this application;

FIG. 4 is a schematic diagram of configurations of a first frame and a second frame;

DESCRIPTION OF EMBODIMENTS

Figures 1, 2:
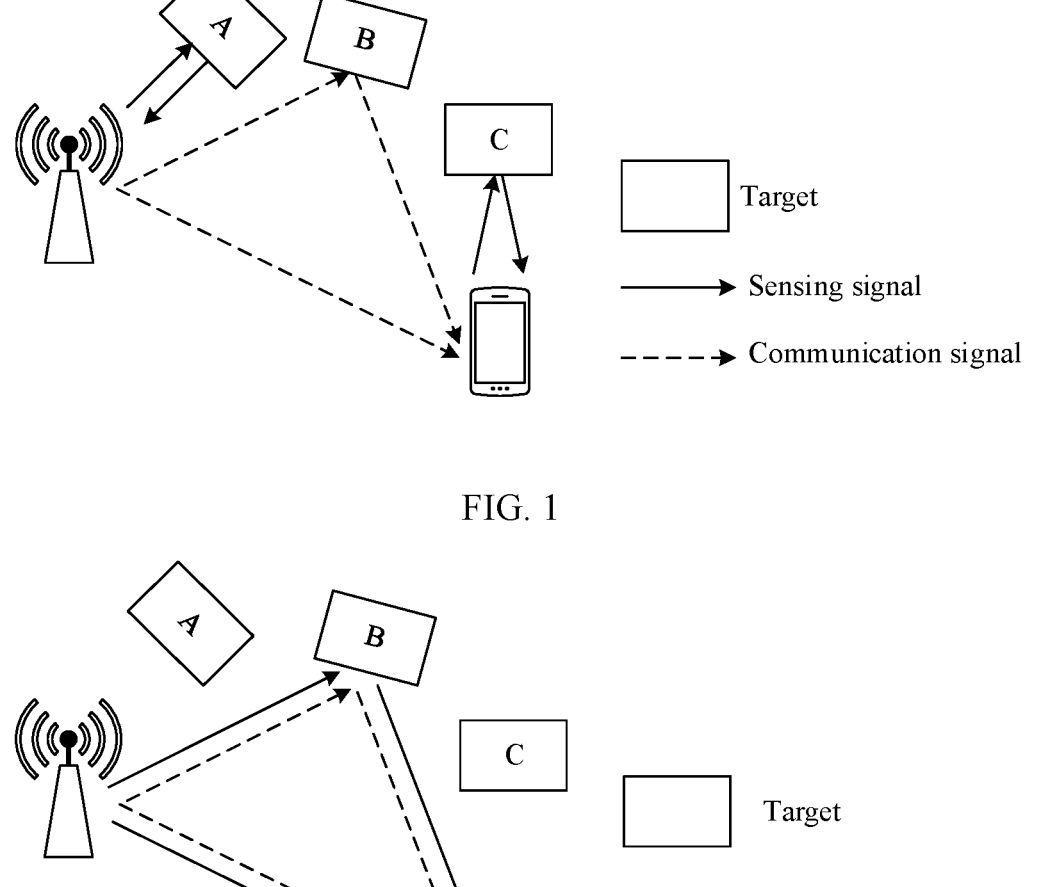
FIG. 1 is a schematic diagram of an architecture of a communication sensing system according to an embodiment of this application.
FIG. 2 is a schematic diagram of an architecture of another communication sensing system according to an embodiment of this application.

The following describes technical solutions of this application with reference to accompanying drawings.

Technical solutions in embodiments of this application may be applied to various communication systems, for example, a long term evolution (LTE) system, an LTE frequency division duplex (FDD) system, an LTE time division duplex (TDD) system, a communication system, a future fifth generation (5G) system, a new radio (NR) system, another future evolved wireless communication system, or the like.

By way of example rather than limitation, a communication apparatus in embodiments of this application may be a device having a wireless communication transceiver function, or an apparatus or a chip system in a device having a wireless communication transceiver function. The communication apparatus in embodiments of this application supports sidelink communication, and may be deployed on land, including indoor or outdoor, road side, hand-held, or vehicle-mounted; may be deployed on water (for example, a ship); or may be deployed in air (for example, on an air plane, a balloon, a satellite, or the like).

By way of example rather than limitation, a first device and a second device in embodiments of this application may be terminal devices, may be network devices, or may be vehicles in vehicle to everything. A terminal device may be a mobile phone, a tablet computer, a computer with a wireless transceiver function, a virtual reality (VR) terminal, an augmented reality (AR) terminal, or an internet of things (IoT) terminal device, a wireless terminal in industrial control, a wireless terminal in self driving, a wireless terminal in remote medical, a wireless terminal in a smart grid, a wireless terminal in transportation security, a wireless terminal in a smart city, a wireless terminal in a smart home, user equipment (UE), a vehicle-mounted communication apparatus, a vehicle-mounted communication chip, a roadside unit, a communication apparatus in a roadside unit, and the like.

By way of example rather than limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, shoes, and the like. The wearable device is a portable device that can be directly worn on a user or integrated into clothes or an accessory of the user. The wearable device is not only a hardware device, but also implements a powerful function through software support, data exchange, and cloud interaction. In a broad sense, wearable intelligent devices include full-featured and large-size devices that can implement all or a part of functions without depending on smartphones, for example, smart watches or smart glasses, and include devices that focus on only one type of application function and need to work with other devices such as smartphones, for example, various smart bands or smart jewelry for monitoring physical signs.

The network device may be a device that provides a wireless communication function service for the terminal device, and is usually located on a network side. For example, the network device includes but is not limited to a next-generation base station (g nodeB, gNB) in fifth generation (5G), an evolved nodeB (eNB), a radio network controller (RNC), a nodeB (NB), a base station controller (BSC), a base transceiver station (BTS), a home base station (for example, a home evolved nodeB, or home nodeB, HNB), a baseband unit (BBU), a transmission reception point (TRP), a transmission point (TP), a mobile switching center, an apparatus that provides a wireless communication service for a terminal device in a V2X communication system, and the like.

The communication system in this application may be further applicable to a vehicle to everything (V2X) technology, that is, the terminal device in this application may alternatively be a vehicle in vehicle to everything, and the network device may be another vehicle in the vehicle to everything such as an intelligent vehicle or a self-driving vehicle. Herein, "X" in V2X represents different communication targets, and V2X may include but is not limited to vehicle to vehicle (V2V), vehicle to infrastructure (V2I), vehicle to network (V2N), and vehicle to pedestrian (V2P).

The following describes technical solutions of this application with reference to accompanying drawings.

FIG. 1 is a schematic diagram of an architecture of a communication sensing system according to an embodiment of this application. As shown in FIG. 1, FIG. 1 shows a self-transmitting and self-receiving communication sensing (mono-static sensing) system, that is, a base station and a terminal may perform sensing by using signals sent by the base station and the terminal. For example, the base station usually performs communication by using a valid payload signal. The base station may directly communicate with a terminal device, or the base station may use a target B to reflect a signal, to communicate with the terminal device. After triggering a sensing task, the base station may send the valid payload signal to a target A in a surrounding environment, and the signal is reflected to the base station through the target A, so that the base station can perform imaging on the target A. Similarly, the terminal device usually communicates with the base station by using a valid payload signal. After triggering a sensing task, the terminal device may send the valid payload signal to a target C in a surrounding environment, and the signal is reflected through the target C to the terminal device, so that the terminal device can perform imaging on the target C.

If a target is far away from the base station, the base station cannot complete sensing and imaging by using the self-transmitting and self-receiving communication sensing system. In this case, a terminal device near the target may assist the base station in completing sensing and imaging by using a base station-assisted terminal communication sensing (bi-static sensing) system, as shown in FIG. 2. FIG. 2 is a schematic diagram of an architecture of another communication sensing system according to an embodiment of this application. When the base station enables the terminal device near the target to assist in completing sensing and imaging, the base station may perform sensing by using a pilot signal. Specifically, the base station may communicate with or sense the terminal device directly by using the pilot signal, or may use the target B to reflect a signal to the terminal device, to communicate with or sense the terminal device. Alternatively, the base station may send indication information to the terminal device near the target, to indicate the terminal device to perform sensing. After receiving the indication information, the terminal device completes an imaging requirement by using the self-transmitting and self-receiving communication sensing system, and uploads the image requirement to the base station.

The base station and the terminal device in FIG. 1 and FIG. 2 are merely examples. The base station may be a vehicle in vehicle to everything, and the terminal device may be another vehicle in vehicle to everything. Therefore, in following descriptions of solutions in specific embodiments of this application, devices that can perform methods in embodiments of this application are generally referred to as a first device and a second device, devices that have communication and sensing capabilities can all fall within the protection scope claimed in this application, and specific devices of the first device and the second device are not limited in this application.

FIG. 3 is a schematic flowchart of a method for sensing and communication according to an embodiment of this application. As shown in FIG. 3, the method mainly includes step 301 to step 303.

301: A first device obtains a sensing parameter, where the sensing parameter includes a physical feature of a sensing target.

In step 301, the first device may obtain the sensing parameter in a plurality of manners. For example, the first device may obtain the sensing parameter by using a second frame, where the second frame may be a frame for sending or receiving a waveform of a communication signal, or may be a frame for sending or receiving a waveform of a sensing signal. When the second frame is the frame for sending or receiving the waveform of the communication signal, the first device may multiplex a signal used for communication, to perform preliminary sensing, and further obtain the sensing parameter. Because a frame that transmits or receives the waveform of the communication signal may be used to perform sensing at the same time when communication is performed, no additional overheads are caused. In addition, a preliminary sensing process has a low requirement on target imaging, and a sensing parameter obtained by using the waveform of the communication signal may be used to determine a condition for configuring a first frame. Alternatively, the first device may obtain the sensing parameter by receiving indication information sent by the second device, that is, the indication information includes a sensing parameter of the second device. When the second device needs assistance of the first device in performing sensing and imaging, the second device may send the sensing parameter obtained by the second device to the first device. After receiving the sensing parameter sent by the second device, the first device determines, based on the sensing parameter, the condition for configuring the first frame, that is, the first device does not need to obtain the sensing parameter on the second frame. It can be learned that all manners in which the first device obtains the sensing parameter can be applied to the solutions of this application. The foregoing manners of obtaining the sensing parameter are merely examples, and are not limited. The sensing parameter includes the physical feature of the sensing target, for example, a radar cross section (RCS) area, a speed, a position, a distance, a moving direction, and the like of the sensing target.

302: The first device configures the first frame based on the sensing parameter, where the first frame includes M first time periods and N second time periods, the first time period is a time period for sending or receiving the waveform of the communication signal, the second time period is a time period for sending or receiving the waveform of the sensing signal, both M and N are integers greater than or equal to 0, and M and N are not 0 at the same time. The first time period and the second time period herein are merely used for differentiation, and are not limited in any sequence.

Specifically, an integrated waveform that is communication signal-oriented is sent in the first time period, the waveform is mainly an orthogonal frequency division multiplexing (OFDM) multicarrier or a single carrier, and the waveform has a communication capability with high efficiency. In the first time period, sensing and communication may be simultaneously performed by using a same waveform. However, in this case, a communication capability is strong, and a sensing capability is poor. An integrated waveform that is radar sensing signal-oriented is sent in the second time period, the radar sensing signal mainly includes a linear frequency modulation (LFM) signal, a phase encoding signal, a step frequency conversion signal, and the like, and the waveform has an efficient radar sensing capability and has a strong sensing capability in the second time period.

The first frame includes M first time periods and N second time periods, where both M and N are integers greater than or equal to 0, and M and N are not 0 at the same time. Specifically, when N=0, the first time period is configured for all of the first frame, and the first device performs sensing on the first frame by using the waveform of the communication signal, and may perform communication at the same time; and when M=0, the second time period is configured for all of the first frame, and the first device performs sensing on the first frame by using the waveform of the sensing signal. When neither M nor N is 0, one first time period and one second time period may be configured for the first frame, sensing is preferentially performed in the second time period, and the first time period is used for communication and/or sensing. When a plurality of first time periods and a plurality of second time periods are configured in the first frame, the first time period and the second time period may be configured at a required interval, sensing is preferentially performed in each second time period, and the first time period is used for communication and/or sensing. Communication and/or sensing may be performed in each first time period, or may be performed in some first time periods. This is not limited in this application.

The following describes structures of the first frame and the second frame with reference to FIG. 4. FIG. 4 is a schematic diagram of configurations of the first frame and the second frame. A first frame 401 is a frame that can be flexibly configured, and a second frame 402 is a frame for sending or receiving the waveform of the communication signal. A time period configured in the second frame 402 may include one or more of a time period used for downlink data transmission, a time period used for uplink data transmission, or a time period in which sensing is performed by using the waveform of the communication signal. A time period configured in the first frame 401 may further include a time period in which sensing is performed by using the waveform of the sensing signal. After obtaining the sensing parameter, the first device may determine configurations of the first frame 401 in different conditions based on the sensing parameter. The first frame 401 includes M first time periods and N second time periods, where both M and N are integers greater than or equal to 0, and M and N are not 0 at the same time. That is, the first time period is configured for all of the first frame 401, the second time period is configured for all of the first frame 401, or both the first time period and the second time period may be configured for the first frame 401. The first frame 401 is merely a name distinguished from the second frame 402, and may also be referred to as an integrated sensing and communication (ISAC) frame. It should be understood that a frame that can flexibly configure the first time period and the second time period is the first frame 401. A name of the first frame 401 is not limited in this application.

Figure 5:
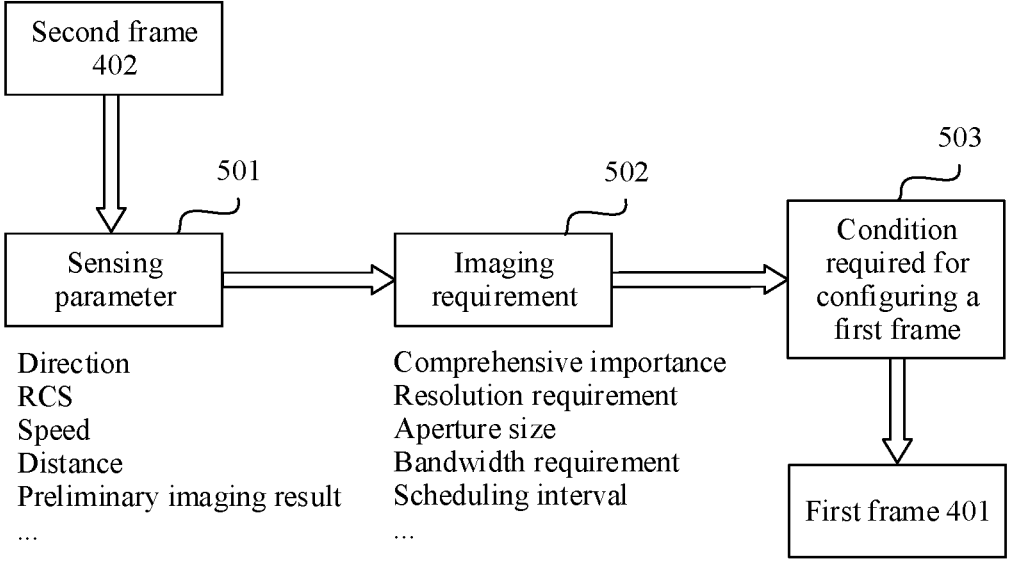
FIG. 5 is a schematic flowchart of configuring a first frame based on a sensing parameter.

FIG. 5 is a schematic flowchart of configuring the first frame based on the sensing parameter. FIG. 5 shows only a case in which the sensing parameter is obtained by using the second frame 402. It should be understood that a solution of receiving the sensing parameter from the second device is also applicable to a process of configuring the first frame 401 based on the sensing parameter shown in FIG. 5.

501: The first device performs preliminary sensing on the second frame, to obtain the sensing parameter, where the sensing parameter is a physical feature of a sensing target. Specifically, after sending a signal to the outside and receiving an echo signal, the first device obtains the sensing parameter of the sensing target based on a signal-to-noise ratio, a delay, a direction of arrival (angle of arrival, AOA), a Doppler frequency shift, and the like of the echo signal. The sensing parameter may include an RCS, a speed, a position, a distance, a movement direction, and the like of the sensing target. A distance, a size, and the like may be obtained by comparing a parameter of the echo signal or a value that is of the foregoing parameters and that is obtained through calculation with a corresponding threshold. For example, the distance of the sensing target may be calculated by using a time difference between sending a signal and receiving the echo signal, and a calculated distance may be compared with a distance threshold to obtain a determining result of the distance of the sensing target. The Doppler frequency shift or a step pulse frequency of the echo signal obtained through measurement may be compared with the corresponding threshold, to obtain a determining result of the speed of the sensing target. A position direction or speed direction of the sensing target may be determined based on the direction of arrival. It should be understood that a specific method for determining the sensing parameter based on the parameter of the echo signal herein is merely used as an example, and is not limited.

502: The first device may obtain an imaging requirement based on the sensing parameter. The imaging requirement is a configuration parameter required by the first device to perform sensing. Specifically, the imaging requirement may include a comprehensive importance that is of a target and that is determined by the first device, a resolution requirement, an aperture size, a bandwidth requirement, a scheduling interval, and the like. For example, imaging is preferentially triggered for a target with a short distance and a fast speed, that is, the target with the short distance and the fast speed has a high imaging priority; and for a target with a long distance and a small speed, an imaging priority is low. For a target with a small RCS, high resolution needs to be configured, or a large imaging aperture or a large bandwidth needs to be configured. The large bandwidth may be used to obtain higher range resolution, and the large imaging aperture may be used to obtain higher horizontal resolution. For a target with a large RCS, low resolution or a small imaging aperture may be configured properly. A beam direction or beam setting may be properly adjusted based on a location direction or a speed direction that is of the sensing target and that is obtained in preliminary sensing, so that sensing is more targeted next time, and better sensing effect is further obtained. It can be learned that a correspondence between the sensing parameter and the imaging requirement may be configured inside the first device, the sensing parameter is compared with a corresponding threshold, and the sensing parameter corresponds to different configuration parameters in different ranges. The correspondence and the threshold may be flexibly set based on different requirements, and specific configurations of the correspondence and the threshold are not limited herein.

503: The first device obtains a condition required for configuring the first frame. After obtaining, through preliminary sensing, the sensing parameter related to the sensing target, the first device obtains, based on a corresponding threshold and a correspondence, a configuration parameter required for obtaining sensing information, that is, the imaging requirement, and then determines, based on the imaging requirement, the condition required for configuring the first frame, so that the first device may further specifically configure the first frame 401 based on a determining result.

Optionally, after obtaining the sensing parameter, the first device may determine, based only on the sensing parameter, the condition required for configuring the first frame 401.

It should be understood that, to determine the condition required for configuring the first frame 401, a correspondence between the sensing parameter or the imaging requirement and the condition and a corresponding threshold need to be preconfigured. That is, when a value related to the sensing parameter or the imaging requirement falls within a specific threshold range, a determining result corresponding to the value may be obtained according to the correspondence. The threshold is determined by a plurality of factors, for example, a current system configuration, an imaging requirement for a target, a beam width, signal transmission power, echo signal strength, and the like. Therefore, in a determined system, a threshold that meets a condition may be determined based on some test methods, for example, a quality simulation test on the imaging requirement, and then a correspondence is preset based on the threshold.

303: The first device performs sensing on the first frame.

The solution in this specific embodiment of this application is used for an integrated sensing and communication system. The first device performs sensing on the first frame configured based on a sensing condition. This ensures that communication is not affected when sensing is performed, and minimizes communication overheads. In addition, sensing or communication is performed on the flexibly configured first frame, and sensing and communication occupy a same spectrum resource, so that requirements of sensing and communication can be met. Therefore, spectral efficiency is further improved.

Figure 6:
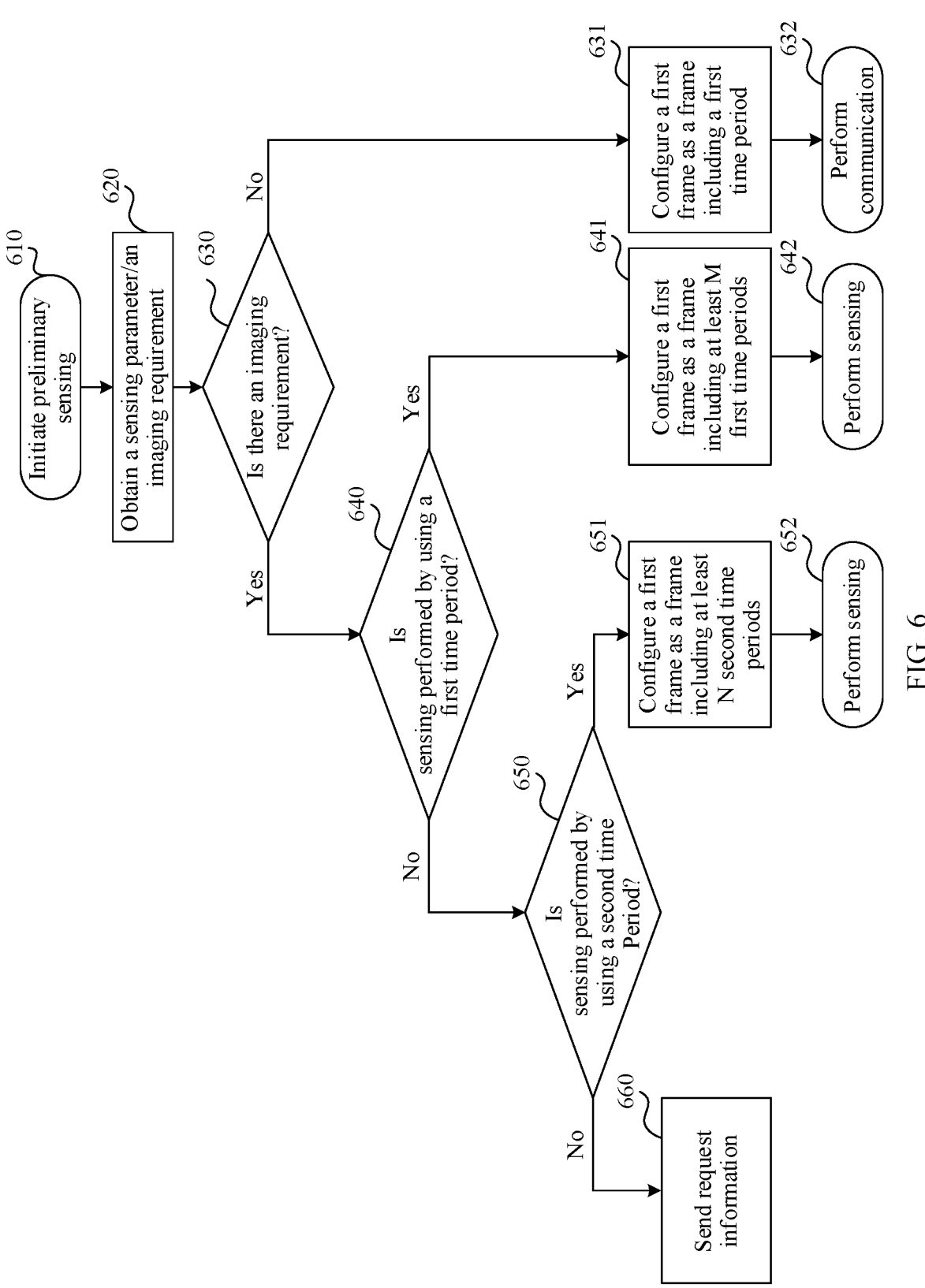
FIG. 6 is a schematic flowchart of configuring a first frame.

FIG. 6 is a schematic flowchart of configuring the first frame, and shows a detailed process of configuring a first frame 401 according to a determining result. A specific procedure is as follows:

610: Initiate preliminary sensing.

The first device may initiate preliminary sensing in a plurality of manners. For example, the first device may multiplex a broadcast signal that is periodically sent, such as an existing synchronization signal, to initiate preliminary sensing on a surrounding target. Alternatively, the first device may initiate preliminary sensing by receiving request information, for example, the request information sent by the second device to the first device when the second device cannot sense the target, or the request information sent by the second device to the first device in another unexpected case. Preliminary sensing is usually performed on a frame for which the first time period is configured. Because in the first time period, sensing may be performed when communication is performed, no additional overhead is caused. In addition, a requirement for target imaging is not high in a preliminary sensing process. Therefore, preliminary sensing may be performed in the first time period. It should be understood that preliminary sensing may also be completed in the second time period, that is, the sensing parameter related to the sensing target is obtained by sending or receiving a waveform of a sensing signal in the second time period.

620: Obtain a sensing parameter and/or an imaging requirement.

After performing preliminary sensing, the first device may obtain a sensing parameter and/or an imaging requirement of a target. For a specific implementation, refer to the foregoing description of the flowchart shown in FIG. 5. Details are not described herein again. After obtaining the sensing parameter or the imaging requirement based on a preliminary sensing result, the first device determines a condition for configuring the first frame. A specific determining process is as follows:

630: Determine whether the first device has an imaging requirement.

631: When there is no imaging requirement, configure the first frame as a frame including the first time period, where the first time period is a time period for sending or receiving a waveform of a communication signal. 632: Perform normal communication on the first frame 401 and the flow ends. When it is determined that there is the imaging requirement, a next step of determining is performed.

640: Determine whether a current sensing target can be sensed by using the first time period. 641: When the first device can sense the sensing target by using the first time period, configure the first frame as a frame including at least M first time periods, where M is an integer greater than 0. Specifically, for example, the first device may learn, based on a measurement value and a corresponding threshold, that a distance between the sensing target and the first device is close, that is, it may be determined that the current sensing target can be sensed by using a valid payload signal. Therefore, the at least M first time periods are configured in the first frame, and sensing and/or communication are/is performed in the M first time periods. Optionally, N second time periods may be further configured in the first frame. In this case, sensing is preferentially performed in the second time period, and then sensing and/or communication are/is performed in the first time period. It should be understood that, when the second time period is not configured, the first device performs sensing and/or communication on the current valid payload signal without increasing additional overheads. 642: Perform sensing on the first frame. When a determining result of the first device is that sensing cannot be performed by using the first time period, a next determining step needs to be performed.

650: Determine whether the current sensing target can be sensed by using the second time period, where the second time period is a time period for sending or receiving a waveform of a sensing signal. 651: When the second device may perform sensing by using the second time period, configure the first frame as a frame including at least N second time periods, where N is an integer greater than 0. Specifically, for example, the first device may learn, based on a measurement value and a corresponding threshold, that the sensing target is large and far away, that is, it may be determined that the current sensing target can be sensing by using a radar sensing waveform. Therefore, the N time periods in the first frame are configured as the second time period, and sensing is performed in the N second time periods. Optionally, the M first time periods may be further configured in the first frame, and sensing and/or communication are/is performed in the M time periods. That is, 652 is performed. 652: Perform sensing on the first frame. When a determining result of the first device is that sensing cannot be performed by using the second time period, the first device may request a second device to assist in performing sensing, where the second device may be nearby UE or a base station.

660: Send request information, where the request information is used to request the first device to obtain the sensing parameter. It should be understood that, when the first device is a sensing device, the first device may receive the request information sent by the second device, to request the first device to obtain the sensing parameter. In this case, the first device initiates preliminary sensing after receiving the request information, that is, the procedure shown in FIG. 6 is performed from step 610. Alternatively, the second device may directly send indication information to the first device, where the indication information includes a sensing parameter that is of the sensing target and that is measured by the second device, that is, the second device directly sends the sensing parameter to the first device, and the first device may determine a sensing condition based on the received sensing parameter. In this case, there is no need to perform preliminary sensing again, that is, the first device only needs to perform the procedure shown in FIG. 6 from step 630. The first device and the second device herein are merely used for differentiation, and are not specifically limited.

After obtaining the sensing parameter and/or the imaging requirement of the sensing target through preliminary sensing, the first device determines whether the first device can perform sensing by using the first time period or the second time period, performs specific configuration on the first frame based on different determining results, and performs sensing on the first frame. This ensures that communication is not affected when sensing is performed, and minimizes communication overheads. In addition, sensing or communication is performed on the flexibly configured first frame, and sensing and communication occupy a same spectrum resource, so that requirements of sensing and communication can be met. Therefore, spectral efficiency is further improved.

Figure 7:
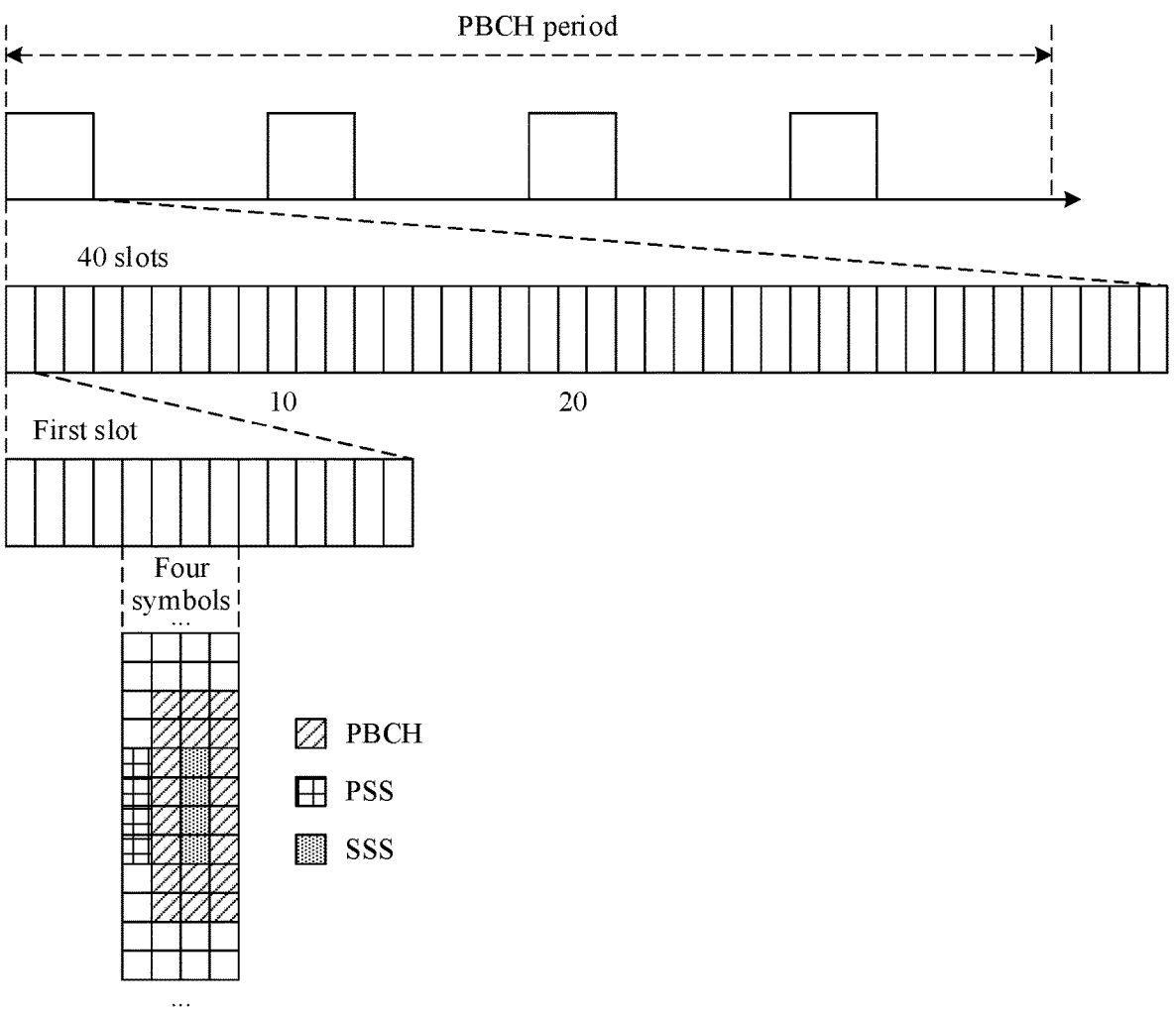
FIG. 7 is a schematic diagram of a preliminary sensing method.
Figures 8, 9:
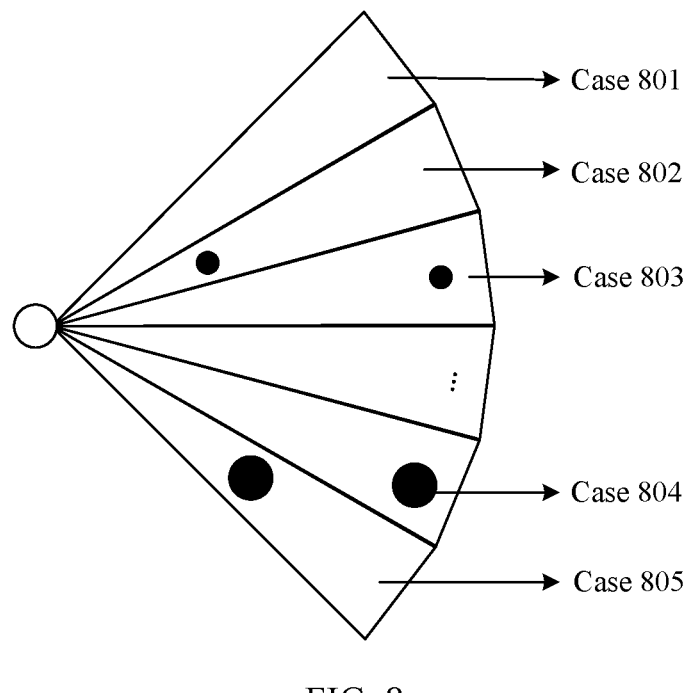
FIG. 8 is a schematic diagram of cognition results of different targets when different targets are swept by using different beams.
FIG. 9 is a schematic diagram of detailed configurations of a first frame in different cases.

The following specifically describes another method for sensing and communication with reference to FIG. 7 to FIG. 9.

FIG. 7 is a schematic diagram of a preliminary sensing method. FIG. 7 shows only a typical configuration structure of a synchronization signal and physical broadcast channel block (synchronization signal and PBCH block, SSB) in an NR architecture when a subcarrier spacing (SCS) is 120 k. This embodiment of this application is merely an example, and is not limited. It should be understood that an SSB of another structure may also be used to perform preliminary sensing on a surrounding environment through periodic beam sweeping. Further, another signal that is periodically sent, for example, a synchronization signal or a broadcast signal, may also be used to perform preliminary sensing on the surrounding environment through periodic sweeping. FIG. 7 shows a resource allocation situation of periodically performing preliminary sensing on the surrounding environment by using the SSB. Specifically, there are four panes in a period of a broadcast channel (physical broadcast channel, PBCH), each pane includes 40 slots, and each slot includes 14 symbols. In four symbols included a first slot of the 40 slots, resource blocks (RB) that are of a PBCH, a primary synchronization signal (PSS), and a secondary synchronization signal (SSS) and that are used for preliminary sensing are included. It should be understood that the RBs of the PBCH, the PSS, and the SSS may be multiplexed while being used for data synchronization. A resource block used for preliminary sensing may be resource blocks of one or more of the PBCH, the PSS, and the SSS, or may be resource blocks of the PBCH, the PSS, and the SSS. This is not limited herein. The SSB performs preliminary cognition on a surrounding target through beam sweeping. When different targets are swept by using different beams, different results are obtained. When performing signal synchronization, the first device also receives a preliminary cognition result, to obtain a sensing condition based on the preliminary cognition result.

The preliminary cognition result is determined based on parameters of a transmitted signal and a reflected signal. For example, a distance of a target may be determined based on a time difference between sending a signal and receiving a reflected signal, a size of a target may be determined based on a ratio of energy of a transmitted signal to energy of a received reflected signal, a direction of a target may be determined based on an AOA, a speed magnitude and a direction of a target may be determined based on a Doppler frequency shift magnitude, and the like. The following specifically describes five cases in a sensing and imaging process with reference to FIG. 8 and FIG. 9.

FIG. 8 is a schematic diagram of cognition results of different targets when different targets are swept by using different beams. FIG. 8 shows cognition results of five possible cases:

Case 801: There is no target.

Case 802: The target is small, and the target is close.

Case 803: The target is small, and the target is far away.

Case 804: The target is large, and the target is far away.

Case 805: The target is large, and a distance of the target is moderate.

According to the cognition results in FIG. 8, the first device configures the first frame in different cases. A specific configuration of the first frame is shown in FIG. 9. FIG. 9 is a schematic diagram of detailed configurations of the first frame in different cases.

Case 801: When there is no imaging target ahead, that is, there is no imaging requirement, all time periods in the first frame are configured as the first time period, and communication is performed on the first frame.

Case 802: The sensing target is close, and imaging may be performed by using a waveform of a communication signal. In other words, a time period in the first frame is configured as the first time period, and sensing is performed on the first frame. In addition, in the case 802, the target is small, that is, an RCS is small, and imaging synthesis time needs to be increased to ensure that sensing information is obtained. Therefore, when the first time period in the first frame is configured, a proportion of time periods configured for downlink data transmission is high.

Case 803: The sensing target is far away, the sensing target is small, and sensing cannot be performed by using a waveform of a communication signal or a waveform of a sensing signal. In this case, a surrounding second device may be requested to assist in sensing, that is, a time period in the first frame is configured as the first time period, and is used to communicate with the second device and send indication information, where the indication information includes a sensing parameter such as a distance or a size of the sensing target.

Case 804: The sensing target is far away, the sensing target is large, that is, an RCS is large, and sensing may be performed by using a waveform of a sensing signal, that is, a time period in the first frame is configured as the second time period, and sensing is performed in the second time period. Because a capability of sensing by using a sensing waveform is stronger than a capability of sensing by using a communication waveform, and time for sensing by using the sensing waveform is less than time for sensing by using the communication waveform, sensing time required in case 804 is short, and when the first frame is configured, only a part of time periods are configured as the second time period, that is, a requirement of obtaining the sensing information can be met. Therefore, remaining time periods may be configured as the first time period, and communication is performed in the first time period.

Case 805: The distance of the imaging target is moderate, and the imaging target is large, that is, an RCS is large. In this case, sensing may be performed by using a waveform of a communication signal, that is, a time period in the first frame is configured as the first time period, and sensing is performed in the first time period. Compared with the case 802, fewer time periods are used to obtain the sensing information in the case 805. Therefore, time periods configured for sensing downlink data transmission may be fewer.

It should be understood that the foregoing five cases are merely examples. Parameters such as a size and a distance of the sensing target are obtained based on a specific measurement value and a threshold, and a related parameter of the sensing target may be obtained by determining a specific threshold and a correspondence. The first device may specifically configure the M first time periods and the N second time periods in the first frame based on an actual situation. This is not limited in this embodiment of this application.

In a specific embodiment of this application, the first device performs preliminary sensing by using the SSB, so that the first device can obtain the sensing parameter and/or the imaging requirement of a target in the surrounding environment without adding additional overheads. Then, the first device determines whether the first device obtains the sensing parameter by using the first time period or the second time period, and performs sensing or communication on the flexibly configured first frame based on different determining results. This minimizes communication overheads while ensuring that sensing is performed. In addition, sensing or communication is performed on the first frame, and the sensing and communication occupy a same spectrum resource, so that requirements for sensing and communication can be met, and spectral efficiency can be improved.

The foregoing describes the method used for sensing and communication provided in this application, and the following describes an apparatus provided used for sensing and communication in this application.

Figure 10:
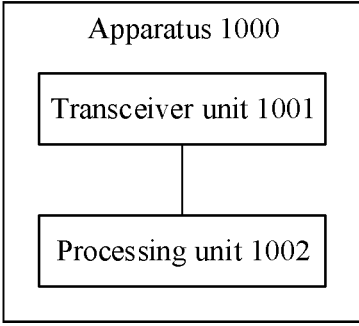
FIG. 10 is a schematic block diagram of an apparatus according to an embodiment of this application.

FIG. 10 is a schematic block diagram of an apparatus 1000 according to an embodiment of this application. As shown in FIG. 10, the apparatus 1000 may include a transceiver unit 1001 and a processing unit 1002.

The transceiver unit 1001 may include a sending unit and/or a receiving unit. The transceiver unit 1001 may be a transceiver (including a transmitter and/or a receiver), and the transceiver unit 1001 may be configured to perform a step that needs to send and/or receive a signal in the foregoing method embodiments.

The processing unit 1002 may be a processor (which may include one or more processors), a processing circuit having a processor function, or the like, and may be configured to perform other steps except sending and/or receiving a signal in the foregoing method embodiments.

The apparatus provided in this application is a device that has both a sensing capability and a communication capability. Therefore, the transceiver unit 1001 needs to support both a communication-oriented waveform and a sensing-oriented waveform, and a receive antenna needs to be added to ensure that when a receive end is in a sensing state, the receive end is also in a state in which the receive end can receive a communication signal.

Optionally, the communication apparatus may further include a storage unit. The storage unit may be a memory, an internal storage unit (for example, a register, a cache, or the like), an external storage unit (for example, a read-only memory, a random-access memory, or the like), or the like. The storage unit is configured to store instructions, and the processing unit 1002 executes the instructions stored in the storage unit, so that the apparatus performs the foregoing methods.

In a possible design, the apparatus 1000 may be corresponding to the first device in the foregoing method embodiments, and may perform operations performed by the first device in the foregoing methods.

In an embodiment, the transceiver unit 1001 may be specifically configured to obtain a sensing parameter, where the sensing parameter is a physical feature of a sensing target.

The processing unit 1002 may be specifically configured to: configure the first frame based on the sensing parameter, or determine an imaging requirement based on the sensing parameter, where the imaging requirement is a configuration parameter required by the transceiver unit to perform sensing, and then configure a first frame based on the imaging requirement. The first frame includes M first time periods and N second time periods, the first time period is a time period for sending or receiving a waveform of a communication signal, the second time period is a time period for sending or receiving a waveform of a sensing signal, both M and N are integers greater than or equal to 0, and M and N are not 0 at the same time.

The transceiver unit 1001 is further configured to perform sensing on the first frame.

In another embodiment, the transceiver unit 1001 is specifically configured to obtain the sensing parameter by using a second frame, where the second frame is a frame for sending or receiving the waveform of the communication signal or the waveform of the sensing signal.

In another embodiment, the transceiver unit 1001 may be further specifically configured to receive request information or indication information sent by a second device, where the request information is used to request to obtain the sensing parameter of the sensing target, and the indication information includes the sensing parameter.

In another embodiment, the transceiver unit 1001 may be further configured to: perform communication and/or sensing in the M first time periods, and perform sensing in the N second time periods.

In another embodiment, when the processing unit 1002 is configured to determine, based on the sensing parameter, to perform sensing by using the first time period, the processing unit 1002 is further configured to configure the first frame as a frame including at least the M first time periods.

In another embodiment, when the processing unit 1002 is configured to determine, based on the sensing parameter, to perform sensing by using the second time period, the processing unit 1002 is further configured to configure the first frame as a frame including at least the N second time periods.

It should be understood that division of the foregoing units is merely function division, and there may be another division method during actual implementation. It should be further understood that the processing unit may be implemented by using hardware, may be implemented by using software, or may be implemented by using a combination of software and hardware.

Figure 11:
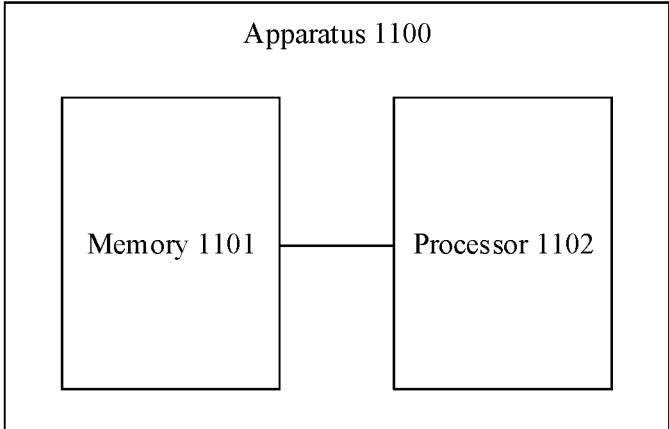
FIG. 11 is a schematic block diagram of another apparatus according to an embodiment of this application.

FIG. 11 is a schematic block diagram of another apparatus 1100 according to an embodiment of this application. The apparatus 1100 includes a memory 1101 and a processor 1102.

The processor 1102 in the apparatus is configured to read and run a computer program stored in the memory 1101, to perform a corresponding operation and/or a procedure performed by the terminal device in the communication method provided in this application. Optionally, the apparatus further includes the memory 1101, the memory 1101 and the processor 1102 are connected to the memory 1101 by using a circuit or an electric wire, and the processor 1102 is configured to read and execute the computer program in the memory 1101, to perform a corresponding operation and/or a procedure performed by the network device in the communication method provided in this application. Further, optionally, the apparatus may further include a communication interface, and the processor 1102 is connected to the communication interface. The communication interface is configured to receive data and/or information that needs to be processed, and the processor 1102 obtains the data and/or information from the communication interface, and processes the data and/or information. The communication interface may be an input/output interface.

In the foregoing embodiments, the processor may be a central processing unit (CPU), a microprocessor, an application-specific integrated circuit (ASIC), one or more integrated circuits configured to control program execution of the technical solutions of this application, or the like. For example, the processor may be a digital signal processor device, a microprocessor device, an analog-to-digital converter, or a digital-to-analog converter. The processor may allocate control and signal processing functions of a terminal device or a network device between these devices based on respective functions of these devices. In addition, the processor may have a function of operating one or more software programs, and the software program may be stored in the memory. The functions of the processor may be implemented by hardware, or may be implemented by hardware executing corresponding software. The hardware or the software includes one or more modules corresponding to the foregoing functions.

The memory may be read-only memory (ROM), another type of static storage device that may store static information and instructions, random access memory (RAM), or another type of dynamic storage device that may store information and instructions, may also be an electrically erasable programmable read-only memory (EEPROM), a compact disc read-only memory (CD-ROM), or another compact disc storage, an optical disc storage (including a compact optical disc, a laser disc, an optical disc, a versatile disc, a Blu-ray disc, or the like), a magnetic disk storage medium or another magnetic storage device, or may be any other medium that can be used to carry or store expected program code in a form of instructions or a data structure and that can be accessed by a computer, or the like.

Optionally, the memory and the processor in the foregoing embodiments may be physically independent units, or the memory may be integrated with the processor.

This application further provides a computer-readable storage medium. The computer-readable storage medium stores instructions. When the instructions are run on a computer, the computer is enabled to perform steps in the method shown in FIG. 3.

This application further provides a computer program product including instructions. When the computer program product runs on a computer, the computer is enabled to perform steps in the method shown in FIG. 3.

In addition, this application further provides a chip. The chip includes a processor, where the processor is configured to store a computer program and disposed independently of the chip, and the processor is configured to execute a computer program stored in a memory, to enable a network device on which the chip is installed to perform an operation and/or processing performed by the terminal device in any method embodiment.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A frame configuration method for sensing, comprising:
obtaining, by a first device, a sensing parameter, wherein the sensing parameter comprises a physical feature of a sensing target;
configuring, by the first device, a first frame based on the sensing parameter, wherein the first frame comprises M first time periods and N second time periods, the first time period is a time period in which the first device sends or receives a waveform of a communication signal, the second time period is a time period in which the first device sends or receives a waveform of a sensing signal, both M and N are integers greater than or equal to 0, and M and N are not 0 at the same time; and
performing, by the first device, sensing on the first frame.

2. The method according to claim 1, wherein the obtaining the sensing parameter further comprises:
obtaining, by the first device, the sensing parameter by using a second frame, wherein the second frame is a frame in which the first device sends or receives the waveform of the communication signal.

3. The method according to claim 1, wherein the obtaining the sensing parameter further comprises:
obtaining, by the first device, the sensing parameter by using a second frame, wherein the second frame is a frame in which the first device sends or receives the waveform of the sensing signal.

4. The method according to claim 1, wherein the obtaining the sensing parameter further comprises:
receiving, by the first device, indication information from a second device, wherein the indication information comprises the sensing parameter.

5. The method according to claim 1, wherein the performing the sensing on the first frame further comprises:
performing, by the first device, communication and/or sensing in the M first time periods, and performing sensing in the N second time periods.

6. The method according to claim 1, wherein the configuring the first frame based on the sensing parameter further comprises:
determining, by the first device, an imaging requirement based on the sensing parameter, wherein the imaging requirement comprises a configuration parameter for performing sensing by the first device; and configuring, by the first device, the first frame based on the imaging requirement.

7. The method according to claim 1, further comprising: receiving, by the first device, request information, wherein the request information is used to request the first device to obtain the sensing parameter.

8. The method according to claim 1, wherein the configuring the first frame based on the sensing parameter further comprises:

in response to the first device determining, based on the sensing parameter, to perform sensing by using the first time period, configuring, by the first device, the first frame as a frame comprising at least the M first time periods.

9. The method according to claim 1, wherein the configuring the first frame based on the sensing parameter further comprises:

in response to a determination made by the first device based on the sensing parameter to perform sensing by using the second time period, configuring, by the first device, the first frame as a frame comprising at least the N second time periods.

10. A communication apparatus comprising:

a memory, wherein the memory is configured to store a computer program; and a processor coupled to the memory, wherein the processor is configured to execute at least one or all of computer programs stored in the memory, to cause the communication apparatus to perform the method according to claim 1.

11. A non-transitory computer-readable storage medium, comprising a computer program, wherein upon at least one or all of computer programs being run on a computer, the computer is caused to perform the method according to claim 1.

12. A frame configuration apparatus for sensing, comprising:

a transceiver, configured to cooperate with a processor to obtain a sensing parameter, and the sensing parameter comprises a physical feature of a sensing target; and the processor, configured to configure a first frame based on the sensing parameter, the first frame comprises M first time periods and N second time periods, the first time period is a time period in which the first device sends or receives a waveform of a communication signal, the second time period is a time period in which a first device sends or receives a waveform of a sensing signal, both M and N are integers greater than or equal to 0, M and N are not 0 at the same time, and the transceiver is further configured to perform sensing on the first frame.

13. The apparatus according to claim 12, wherein the transceiver is configured to obtain the sensing parameter by using a second frame, wherein the second frame is a frame for sending or receiving the waveform of the communication signal.

14. The apparatus according to claim 12, wherein the transceiver is configured to obtain the sensing parameter by using a second frame, wherein the second frame is a frame for sending or receiving the waveform of the sensing signal.

15. The apparatus according to claim 12, wherein in obtaining the sensing parameter, the transceiver is configured to:

receive indication information from a second device, wherein the indication information comprises the sensing parameter.

16. The apparatus according to claim 12, wherein in performing sensing on the first frame, the transceiver is further configured to:

perform communication and/or sensing in the M first time periods, and perform sensing in the N second time periods.

17. The apparatus according to claim 12, wherein in configuring the first frame based on the sensing parameter, the processor is further configured to:

determine an imaging requirement based on the sensing parameter, wherein the imaging requirement comprises a configuration parameter for performing sensing by the transceiver; and configure the first frame based on the imaging requirement.

18. The apparatus according to claim 12, wherein the transceiver is further configured to receive request information, and the request information is used to request to obtain the sensing parameter.

19. The apparatus according to claim 12, wherein in configuring the first frame based on the sensing parameter, the processor is further configured to:

configure the first frame as a frame comprising at least the M first time periods, in response to a determination made by the processor based on the sensing parameter to perform sensing by using the first time period.

20. The apparatus according to claim 12, wherein in configuring the first frame based on the sensing parameter, the processor is further configured to:

configure the first frame as a frame comprising at least the N second time periods, in response to a determination made by the processor based on the sensing parameter to perform sensing by using the second time period.

* * * * *